(12) United States Patent
Maegawa et al.

(10) Patent No.: US 8,452,892 B2
(45) Date of Patent: May 28, 2013

(54) SCHEDULING APPARATUS AND METHOD

(75) Inventors: Tomonori Maegawa, Tokyo (JP);
Keisuke Mera, Kanagawa-ken (JP);
Shigeo Matsuzawa, Tokyo (JP); Koichi Ikeda, Kanagawa-ken (JP); Nobutaka Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 231 days.

(21) Appl. No.: 12/923,207

(22) Filed: Sep. 9, 2010

(65) Prior Publication Data

US 2011/0066758 A1 Mar. 17, 2011

(30) Foreign Application Priority Data

Sep. 16, 2009 (JP) ................. P2009-214636

(51) Int. Cl.
*G06F 12/173* (2006.01)
*H04L 12/00* (2006.01)

(52) U.S. Cl.
USPC ........... 709/240; 370/468; 709/234; 709/248; 709/219

(58) Field of Classification Search
USPC ........................ 370/468; 709/234, 240, 248
See application file for complete search history.

(56) References Cited

U.S. PATENT DOCUMENTS

| | | | | |
|---|---|---|---|---|
| 5,828,835 A | * | 10/1998 | Isfeld et al. | 709/200 |
| 5,916,306 A | * | 6/1999 | Ruiz | 709/242 |
| 5,926,458 A | * | 7/1999 | Yin | 370/230 |
| 6,058,420 A | * | 5/2000 | Davies | 709/224 |
| 6,067,107 A | * | 5/2000 | Travaille et al. | 725/24 |
| 6,091,740 A | * | 7/2000 | Karasawa | 370/458 |
| 6,154,681 A | | 11/2000 | Drees et al. | |
| 6,711,137 B1 | * | 3/2004 | Klassen et al. | 370/252 |
| 6,865,427 B2 | * | 3/2005 | Brown et al. | 700/19 |
| 7,099,968 B2 | * | 8/2006 | Rengarajan | 710/107 |

(Continued)

FOREIGN PATENT DOCUMENTS

| | | |
|---|---|---|
| JP | 2003-218981 | 7/2003 |
| JP | 2005-135644 | 5/2005 |
| JP | 2005-184616 | 7/2005 |
| JP | 2009-110196 | 5/2009 |

OTHER PUBLICATIONS

Updated machine translation of Japanese publication JP2003-218981 (from application JP2002-17339). Jul. 31, 2003.*

(Continued)

*Primary Examiner* — Lynn Feild
*Assistant Examiner* — Benjamin A Jenkins
(74) *Attorney, Agent, or Firm* — Nixon & Vanderhye, P.C.

(57) ABSTRACT

According to one embodiment, a scheduling apparatus sends queries to communication modules in buildings and receives facility information measured at monitor-control points from the communication modules. As for each communication module, a network address, a waiting time to receive the facility information after sending a query, and a connection with the monitor-control points, are stored. When a service request indicating at least one monitor-control point is received, queries each including the network address of a communication module connected with a monitor-control point indicated by the service request, are generated. A priority of each query is decided based on the waiting time corresponding to the communication module. Each query is added to a first send queue or a second send queue based on the priority. When queries are sent, a timing to send from the first send queue is same as or earlier than a timing to send from the second send queue.

6 Claims, 17 Drawing Sheets

U.S. PATENT DOCUMENTS

| | | | |
|---|---|---|---|
| 7,385,986 B2* | 6/2008 | Ono et al. | 370/395.4 |
| 7,395,537 B1* | 7/2008 | Brown et al. | 718/104 |
| 7,685,250 B2* | 3/2010 | Connor et al. | 709/214 |
| 7,751,315 B1* | 7/2010 | Pai et al. | 370/230 |
| 7,808,913 B2* | 10/2010 | Ansari et al. | 370/241 |
| 7,817,642 B2* | 10/2010 | Ma et al. | 370/395.4 |
| 7,912,976 B2* | 3/2011 | Guthrie et al. | 709/232 |
| 8,054,850 B2 | 11/2011 | Demachi et al. | |
| 8,102,767 B2* | 1/2012 | Marcellin | 370/232 |
| 8,122,145 B2* | 2/2012 | Muhonen et al. | 709/235 |
| 8,132,054 B2* | 3/2012 | Fu et al. | 714/33 |
| 2001/0024446 A1* | 9/2001 | Craig et al. | 370/412 |
| 2002/0032777 A1* | 3/2002 | Kawata et al. | 709/226 |
| 2003/0046339 A1* | 3/2003 | Ip | 709/203 |
| 2003/0188013 A1* | 10/2003 | Nishikado et al. | 709/238 |
| 2003/0216155 A1* | 11/2003 | Kobayashi | 455/561 |
| 2004/0172476 A1* | 9/2004 | Chapweske | 709/231 |
| 2005/0018611 A1* | 1/2005 | Chan et al. | 370/241 |
| 2005/0043037 A1* | 2/2005 | Ioppe et al. | 455/456.1 |
| 2006/0195508 A1* | 8/2006 | Bernardin et al. | 709/203 |
| 2007/0026881 A1* | 2/2007 | Tzavidas et al. | 455/517 |
| 2008/0101406 A1* | 5/2008 | Matoba | 370/468 |
| 2008/0168130 A1* | 7/2008 | Chen et al. | 709/203 |
| 2008/0228978 A1 | 9/2008 | Wei et al. | |
| 2009/0210876 A1* | 8/2009 | Shen et al. | 718/100 |
| 2009/0213871 A1* | 8/2009 | Carlson et al. | 370/462 |
| 2009/0310490 A1* | 12/2009 | Sekine | 370/238 |
| 2010/0095299 A1* | 4/2010 | Gupta et al. | 718/103 |
| 2010/0149971 A1* | 6/2010 | Noriega | 370/230 |

OTHER PUBLICATIONS

Office Action dated Jan. 20, 2012 in JP Application 2009-214636 with English-language translation.
English-language machine translation of JP 2003-218981.
English-language machine translation of JP 2005-135644.
European Search Report dated Aug. 1, 2012 in European patent application No. 10175732.6.
Wen-Ya Chung et al.; A Flexible Hierarchical and Distributed Control Kernel Architecture for Rapid Resource Integration of Intelligent Building Systems; 2001 IEEE International Conference on Robotics and Automation, Seoul, Korea; May 21-21, 2001; pp. 1981-1987.
Hong S.H. et al.; A Bandwidth Allocation Scheme on MS/TP Protocol; 2005 3$^{rd}$ Conference on Industrial Informatics; Perth, Australia; Aug. 10-12, 2005; pp. 523-528.

* cited by examiner

| BUILDING ID | COMMUNICATION MODULE ID | PROTOCOL TYPE INFORMATION | NETWORK ADDRESS | WAITING TIME BEFORE STARTING TO RECEIVE | AVERAGE SIZE OF REPLY DATA |
|---|---|---|---|---|---|
| BLD001 | COM001 | PROTOCOL-A-GET | 10.0.0.1, SERVICE PORT ID | 00:15 | 3KB |
| BLD002 | COM002 | PROTOCOL-B-GET | 10.1.2.3, SERVICE PORT ID | 00:03 | 2KB |
| BLD003 | COM003 | PROTOCOL-A-GET | 10.2.3.4, SERVICE PORT ID | 00:20 | 3KB |

FIG. 2

| BUILDING ID | COMMUNICATION MODULE ID | POINT ID |
|---|---|---|
| BLD001 | COM001 | PNT001 |
| BLD002 | COM002 | PNT002 |
| BLD003 | COM003 | PNT003 |

| SERVICE REQUEST ID | SERVICE ID | ACCEPTABLE FORWARD TIME | ACCEPTABLE DELAY TIME | POINT ID |
|---|---|---|---|---|
| REQ00001 | SRV001 | 9:57 | 10:03 | PNT00001 |
| REQ00002 | SRV001 | 9:56 | 10:04 | PNT00002 |
| REQ00003 | SRV002 | 9:55 | 10:05 | PNT00003 |

FIG. 7

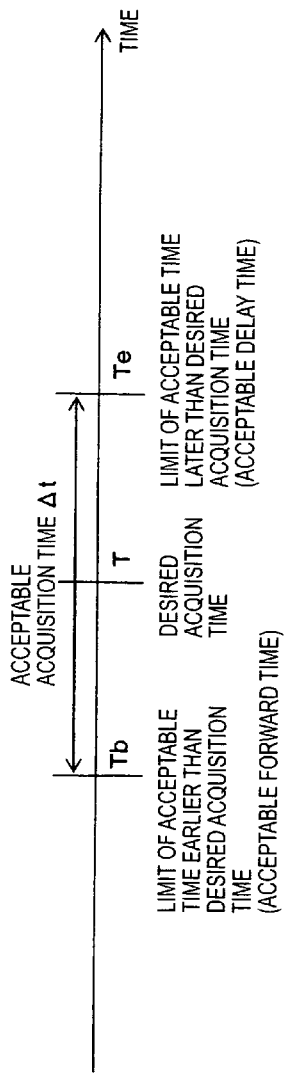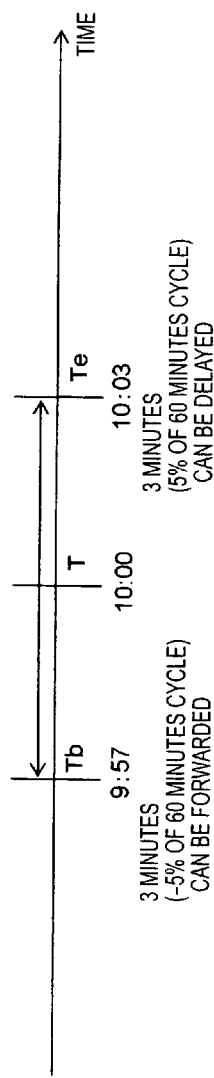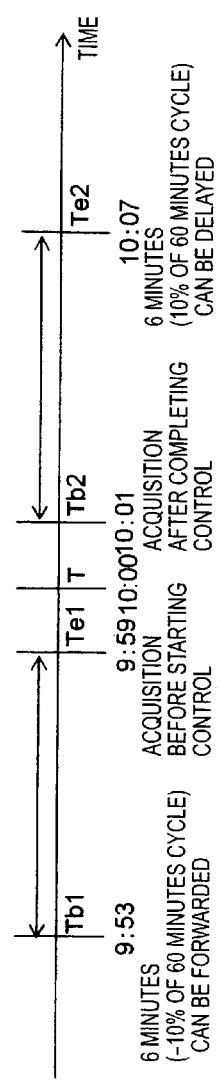

| QUERY ID | CONTENTS OF QUERY | REPLY SIZE OF QUERY | DESTINATION ADDRESS | ACCEPTABLE TIME OF STARTING TO SEND | DEAD LINE TIME OF SENDING | WAITING TIME BEFORE STARTING TO RECEIVE REPLY |
|---|---|---|---|---|---|---|
| QRY00001 | PROTOCOL-A-GET, POINT ID | 3KB | 10.0.0.1, SERVICE PORT ID | 9:55:30 | 10:02:30 | 30 SECONDS |
| ... | ... | ... | ... | ... | ... | ... |
| ... | ... | ... | ... | ... | ... | ... |

FIG. 9

SCHEDULING APPARATUS AND METHOD

CROSS-REFERENCE TO RELATED APPLICATION

This application is based upon and claims the benefit of priority from Japanese Patent Application No. 2009-214636, filed on Sep. 16, 2009; the entire contents of which are incorporated herein by reference.

FIELD

Embodiments described herein relate generally to an apparatus and a method for scheduling sending of queries to facilities in buildings.

BACKGROUND

In a scheduling system of data access type according to conventional technology, for each web server, a frequency to update contents on the server is recorded and estimated. Based on the frequency, an interval to acquire the contents is determined. For example, this method is disclosed in JP-A 2009-110196 (Kokai).

However, in case of acquiring facility data from facilities in various buildings by using above method, some facility starts to reply late after receiving a request from a data acquisition side. Accordingly, non-usage time of network increases at the data acquisition side. As a result, usage efficiency of network band falls, and it takes a long time to acquire the facility data from the facilities.

BRIEF DESCRIPTION OF THE DRAWINGS

FIG. 2 is a schematic diagram of communication module profile information.

FIG. 7 is a schematic diagram of service request information.

FIGS. 8A, 8B and 8C are time charts of examples of an acceptable forward time and an acceptable delay time.

FIG. 9 is a schematic diagram of a list of queries.

DETAILED DESCRIPTION

Figure 1:
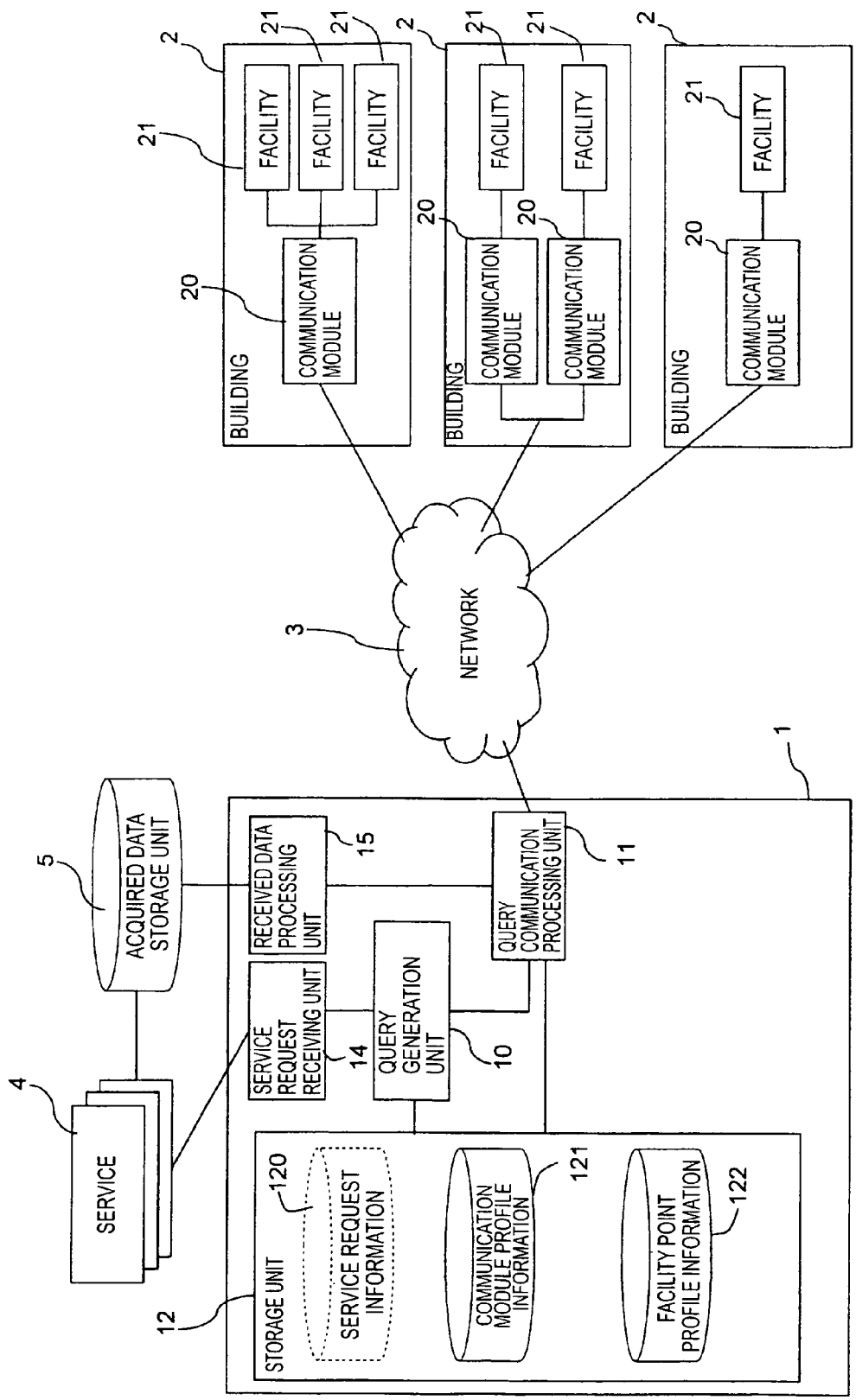
FIG. 1 is a block diagram of a scheduling apparatus according to a first embodiment.

In general, according to one embodiment, a scheduling apparatus sends queries to communication modules in buildings and receives facility information measured at monitor-control points from the communication modules. The scheduling apparatus includes a storage unit, a receiving unit, a generation unit, and a processing unit. The storage unit stores a network address of each communication module, a waiting time to receive the facility information from each communication module after sending a query, and a connection between each communication module and the monitor-control points. The receiving unit receives a service request indicating at least one monitor-control point. The generation unit generates queries by referring to the storage unit. Each query includes the network address of a communication module connected with a monitor-control point indicated by the service request. Furthermore, the generation unit decides a priority of each query based on the waiting time corresponding to the communication module. The processing unit adds each query to a first send queue or a second send queue based on the priority, and sends queries from the first send queue and queries from the second send queue. A timing to send from the first send queue is same as or earlier than a timing to send from the second send queue.

Hereinafter, embodiments of the present invention will be explained by referring to the drawings. The present invention is not limited to the following embodiments.

The First Embodiment

FIG. 1 is a block diagram of a scheduling apparatus according to the first embodiment. The scheduling apparatus is connected to each communication module 20 of various buildings 2 via a network 3.

As to the scheduling apparatus 1, by sending a query (inquiry such as data acquisition or control instruction for facility) to the communication module 20, facility information (facility data) of a facility 21 are acquired. For example, the facility information of the facility 21 is, in case of an air-conditioning system, a measured value such as a room temperature or an electric power, an integrated value such as an operating time or power consumption, and a status value such as ON/OFF state or heating/cooling mode. By accessing a point (monitor-control point) via the network 3, facility information at timing of access is acquired.

As to the building 2, a small-scale office building below the total floor area "3000 $m^2$", a middle-scale office building having the total floor area "several tens of thousands $m^2$", and a large-scale office building above the total floor area "50000 $m^2$" are included. Furthermore, a commercial facility, an amusement facility, a factory, a government facility, and a school facility, are also included.

In the building 2, as the facility 21, an air-conditioning facility, an illumination facility, an electric source facility, a sanitary facility, a crime prevention facility, a disaster prevention facility, and an elevator facility each designed for building scale or various uses, are maintained and operated.

The facility 21 sends facility information measured by the point to the communication module 20. In order for service to utilize the scheduling apparatus 1 of the first embodiment, the communication module 20 may be newly executed into the building 2. However, in many existing buildings, the communication module 20 having various systems for each building scale or each use is induced to monitor or maintain the building. Briefly, the communication module 20 has various communication performances. Furthermore, as to protocol of the communication module 20, an open protocol such as BACnet or LonWorks, a remote protocol such as web service, and an original protocol by vendor, are applied.

The scheduling apparatus 1 includes a query generation unit 10, a query communication processing unit 11, a storage unit 12, a service request receiving unit 14 and a received data processing unit 15.

The query generation unit 10 generates queries (inquiry such as data acquisition or control instruction for facility), and decides a priority for sending order of each query. The query communication processing unit 11 sends a query to the facility 21 in the building 2, and receives facility information. The query communication processing unit 11 includes a plurality of send queues for each priority. Each query (generated by the query generation unit 10) is added to the send queue corresponding to the priority of the queue.

The storage unit 12 stores a communication module profile information 121 and a facility point profile information 122. This information may be defined as a table of relational database or files having predetermined format.

The communication module profile information 121 is characteristic information of the communication module 20 in each building 2 connected with the scheduling apparatus 1. As shown in FIG. 2, the communication module profile information 121 includes a building ID (representing a building 2 in which the communication module 20 is installed), a communication module ID, a protocol type information, a network address, a waiting time before starting to receive, and an average size of reply data. In this case, the communication module ID is an identifier (location information) to uniquely identify each communication module 20 by the scheduling apparatus 1. Furthermore, the waiting time before starting to receive is a time between a sending time of query and a receiving time of reply.

Figure 3:
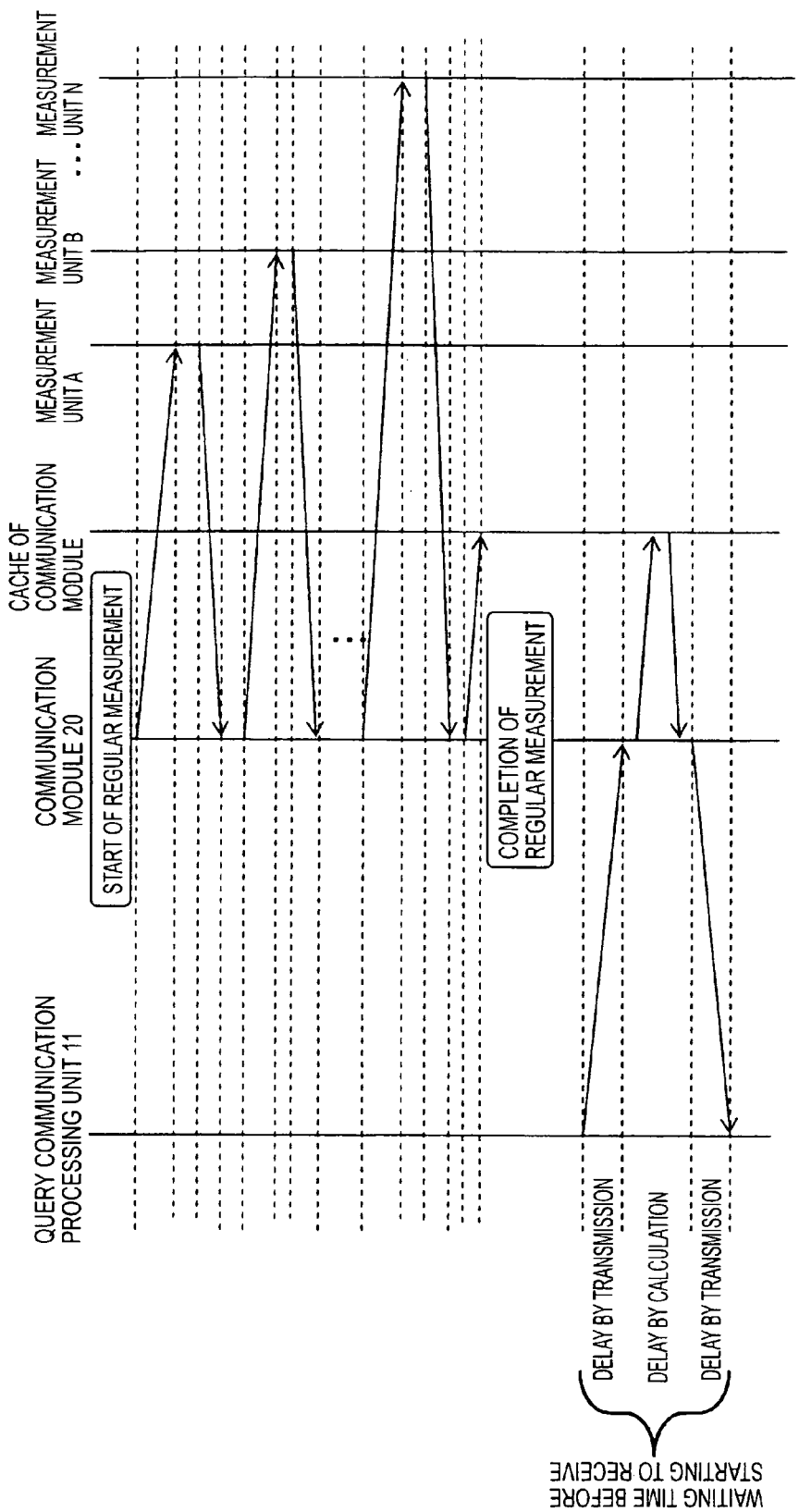
FIG. 3 is a sequence chart showing one example of a reply from a communication module.

As the communication module 20, a first communication module which early starts to reply, and a second communication module which late starts to reply, are included. As to the first communication module, as shown in FIG. 3, facility information is previously acquired, and stored in a cache memory. In response to a query from the query communication processing unit 11, the first communication module can start to reply within one second, and delay to acquire the facility information does not occur.

Figure 4:
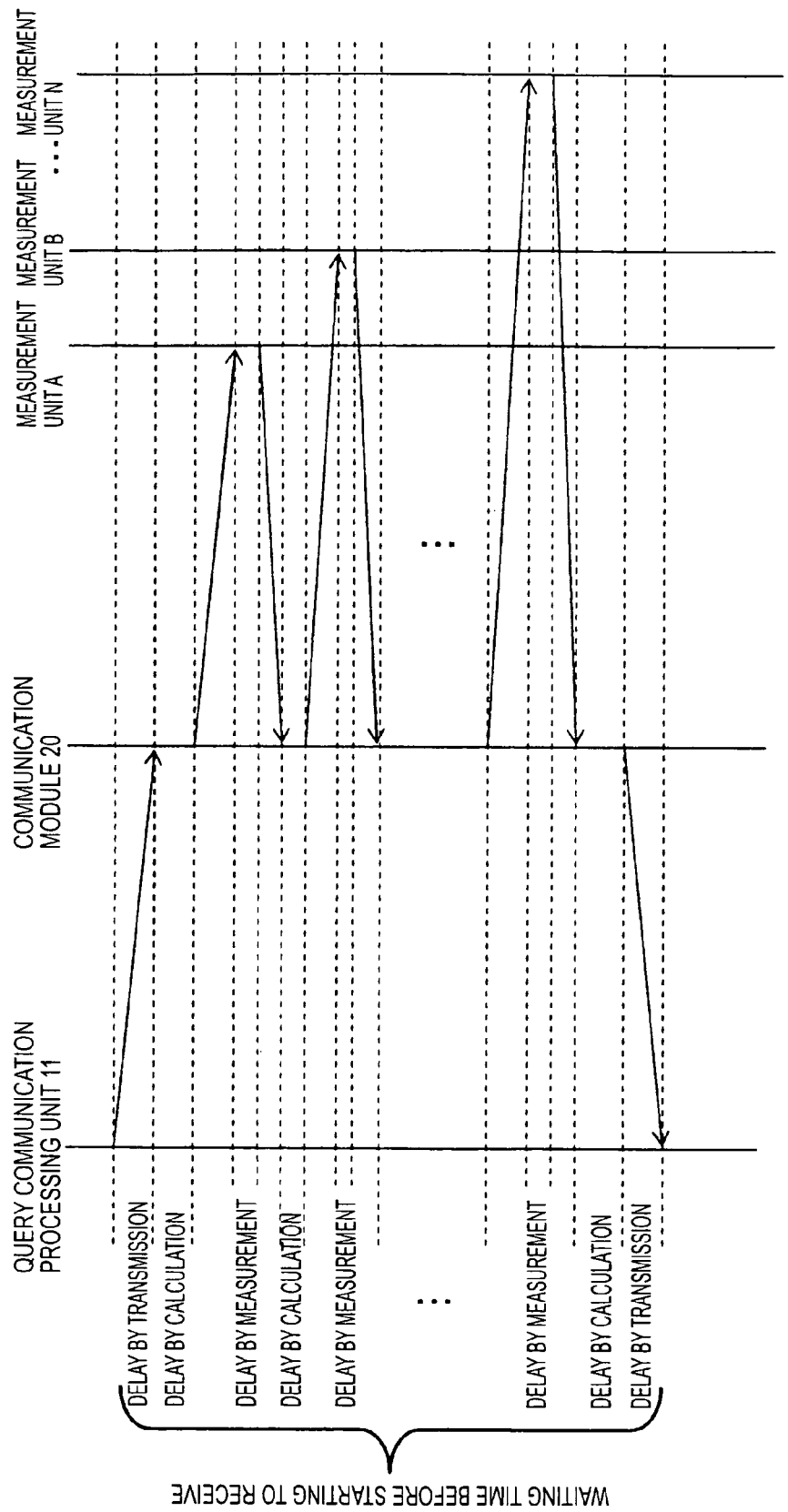
FIG. 4 is a sequence chart showing another example of the reply from the communication module.

On the other hand, as to the second communication module, as shown in FIG. 4, in response to a query from the query communication processing unit 11, facility information is acquired. Accordingly, delay to acquire the facility information occurs, and it takes several seconds ~several ten seconds to start to reply.

Figures 5, 6:
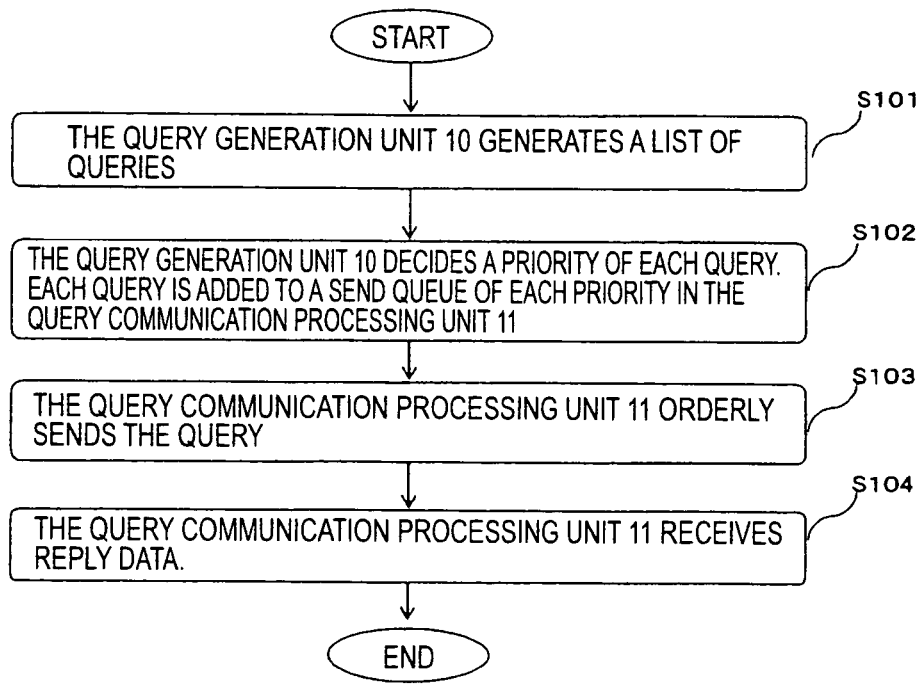
FIG. 5 is a schematic diagram of facility point profile information.
FIG. 6 is a flow chart of a scheduling method according to the first embodiment.

The facility point profile information 122 is characteristic information of "a point (monitor-control point)" at which facility information is acquired by the scheduling apparatus 1. As shown in FIG. 5, the facility point profile information 122 includes a building ID, a communication module ID, and a point ID. The point ID is an identifier to uniquely identify each point by the scheduling apparatus 1. The building ID is an identifier to uniquely identify a building in which a facility 2 having the monitor-control point identified by the point ID. The communication module ID is an identifier to uniquely identify the communication module 20 which sends facility information measured at the monitor-control point (identified by the point ID) via a network. By referring to the facility point profile information 122, a connection relationship among the point ID (each monitor-control point), the building ID and the communication module ID is represented. Briefly, how to acquire facility information measured at some monitor-control point is represented by a pair of the communication module and the building to be accessed.

The service request receiving unit 14 receives a service request indicated at arbitrary timing, directly from a service 4, or indirectly via a mechanism abstracted by a middleware. The query generation unit 10 acquires service request information from the service request receiving unit 14, and generates queries based on the communication module profile information 121 and the facility point profile information 122. The query generation unit 10 creates a list of the queries for each priority, and supplies the list to the query communication processing unit 11. The service request information 120 may be previously stored in the storage unit 12.

The query generation unit 10 operates at a predetermined interval T (for example, one minute) indicated by the scheduling apparatus 1, and creates a list of queries for "T1 minutes" period (target period to create a list of queries). This target period starts at T1+n minutes (n is sufficient time to previously create the list, for example, three) forwarded from the present time.

The query communication processing unit 11 sends queries and receives reply data (facility information) by method explained afterward, and supplies the reply data to the received data processing unit 15. The received data processing unit 15 stores the reply data into an acquired data storage unit 5.

By using network address information, service port information and access confirmation information necessary to connect with the communication module 20, the query communication processing unit 11 starts to connect with the communication module 20 according to a communication protocol to support the communication module 20 (This operation is not shown in FIG.). Then, the query communication processing unit 11 sends queries and receives reply data.

As the communication protocol, for example, an Internet standard protocol (such as HTTP, SMTP, FTP, SNMP), a protocol for building system (such as BACnet/IP, LonWorks, OPC, FL-net), and each original protocol for vendor, can be used. Furthermore, as data representation of query, in addition to format fixed by each communication protocol, each representation based on XML schema standard (such as BACnet/WS, oBIX, OPC XML) can be used.

Next, operation of the scheduling apparatus 1 is explained by referring to a flow chart of FIG. 6. The scheduling apparatus 1 starts to operate at timing such as when service request information is changed, when the communication module profile information 121 is updated, when an operation start request is received from outside, or when the present time is a time based on a period parameter related to acquisition operation (For example, service request is processed at ten minutes interval from 23:55) indicated by the scheduling apparatus 1.

(S101) The query generation unit 10 creates a list of queries necessary to receive facility information (point data) required by each service request. A method for creating the list is explained afterward.

One example of the service request information is shown in FIG. 7. As information required by each service utilizing the scheduling apparatus 1, the service request information includes a service request ID, a service ID, an acceptable forward time, an acceptable delay time, and a point ID as a target to acquire data. Each service is, for example, an energy-saving visualization service of facility, an energy-saving operation service of facility, a transaction service of $CO^2$-discharge, a power-consumption adjustment service, a remote-maintenance service of facility, i.e., services utilizing information of each facility 21 in each building 2 by various methods.

The service request information is sent to the scheduling apparatus 1 via the service request receiving unit 14. The service request information is concretely described as a request to acquire facility information at timing such as addition of service, setting of service or execution of service. For example, the request is "facility information of XX at 10 A.M. is desired" or "facility information of ΔΔ before and after controlling at 10 A.M. is desired".

As shown in FIG. 8A, the acceptable forward time and the acceptable delay time represent an acceptable difference from a desired time to acquire facility information. For example, as shown in FIG. 8B, as to a request "facility information of XX at 10 A.M. is desired", assume that an acceptable difference from a cycle "60 minutes" to acquire facility information is ±5%. In this case, the desired acquisition time is "10:00". Accordingly, as the acceptable forward time, 3 minutes (5% of 60 minutes) is subtracted from the desired acquisition time, i.e., "9:57" is described. In the same way, as the acceptable delay time, 3 minutes (5% of 60 minutes) is added to the desired acquisition time, i.e., "10:03" is described.

Furthermore, as shown in FIG. 8C, as to a request "facility information of ΔΔ before and after controlling at 10 A.M. is desired", assume that an acceptable difference from a control cycle "60 minutes" to acquire facility information is ±10%. As to acquisition of facility information before controlling, the desired acquisition time is "9:59". In this case, as the acceptable forward time, 6 minutes (10% of 60 minutes) is subtracted from the desired acquisition time, i.e., "9:53" is described. Furthermore, as a time immediately before controlling, "9:59" is described. In the same way, as to acquisition of facility information after controlling, the desired acquisition time is "10:01" (start time to control). Furthermore, as the acceptable delay time, 6 minutes (10% of 60 minutes) is added to the desired acquisition time, i.e., "10:07" is described.

In above explanation, concrete times are described. However, a method for repeatedly representing such as "on the hour every hour" may be determined, or a function to calculate a next acquisition time based on some acquisition time may be determined. Furthermore, in a period corresponding to change of information in facilities such as "stand-by time in the morning", a cycle to acquire the information may be shortened. In a period corresponding to regular status of information, the cycle may be lengthened. Briefly, the service may utilize the cycle to acquire facility information based on a statue of facilities.

Furthermore, based on a band or reliability of communication circuit (used by the scheduling apparatus 1), a threshold to determine a priority of query (explained afterward), upper-lower limits of cycle or accuracy to process a request to acquire facility information determined by the number of queries to be sent in an unit period (For example, it takes more than 80 seconds for 1 Mbps band to send 1 KB queries as ten thousands. If this band is not widened, the cycle cannot be less than 80 seconds.), the scheduling apparatus 1 may present information to select from a plurality of service request levels to services. In this case, each service describes a service request by selecting desired one from the plurality of service request levels. The service request is described so that the scheduling apparatus 1 can understand the period to acquire facility information.

The query generation unit 10 generates a list of queries as shown in FIG. 9. The list of queries is information to determine a sequence or an interval to send queries from the query communication processing unit 11. The list of queries includes a query ID, contents of query (protocol type, point ID to acquire data), a reply size of query, a destination address, an acceptance time of starting to send, a deadline time of sending, and a waiting time before starting to receive reply.

(S102) The query generation unit 10 decides a priority of each query in the list. Each query is orderly added to a plurality of send queues each differently corresponding to a priority in the query communication processing unit 11. Detail processing of this step is explained afterward.

(S103) The query communication processing unit 11 orderly sends each query based on a queue selection algorithm (previously selected). Queue-sending processing by the query communication processing 11 is explained afterward.

(S104) The query communication processing unit 11 receives reply data (facility information of the facility 21) from the communication module 20 via the network 3. The received data processing unit 15 stores the reply data into the acquired data storage unit 5.

Moreover, when an error message representing that facility information cannot be acquired is received, the query communication processing unit 11 informs the query generation unit 10 to add the query to the list again.

Furthermore, when the communication module 20 cannot reply by any trouble or constraint, or when reply data is not received by network status, the query communication processing unit 11 cancels a connection to send queries based on a predetermined time-out period, and informs the query generation unit 10 to add the query to the list. In order to execute such retry processing, the query communication processing unit 11 desirably preserves information of queries (already sent) in a period having real number times (For example, five times) as long as operation period T1 of the scheduling apparatus 1.

Figure 10:
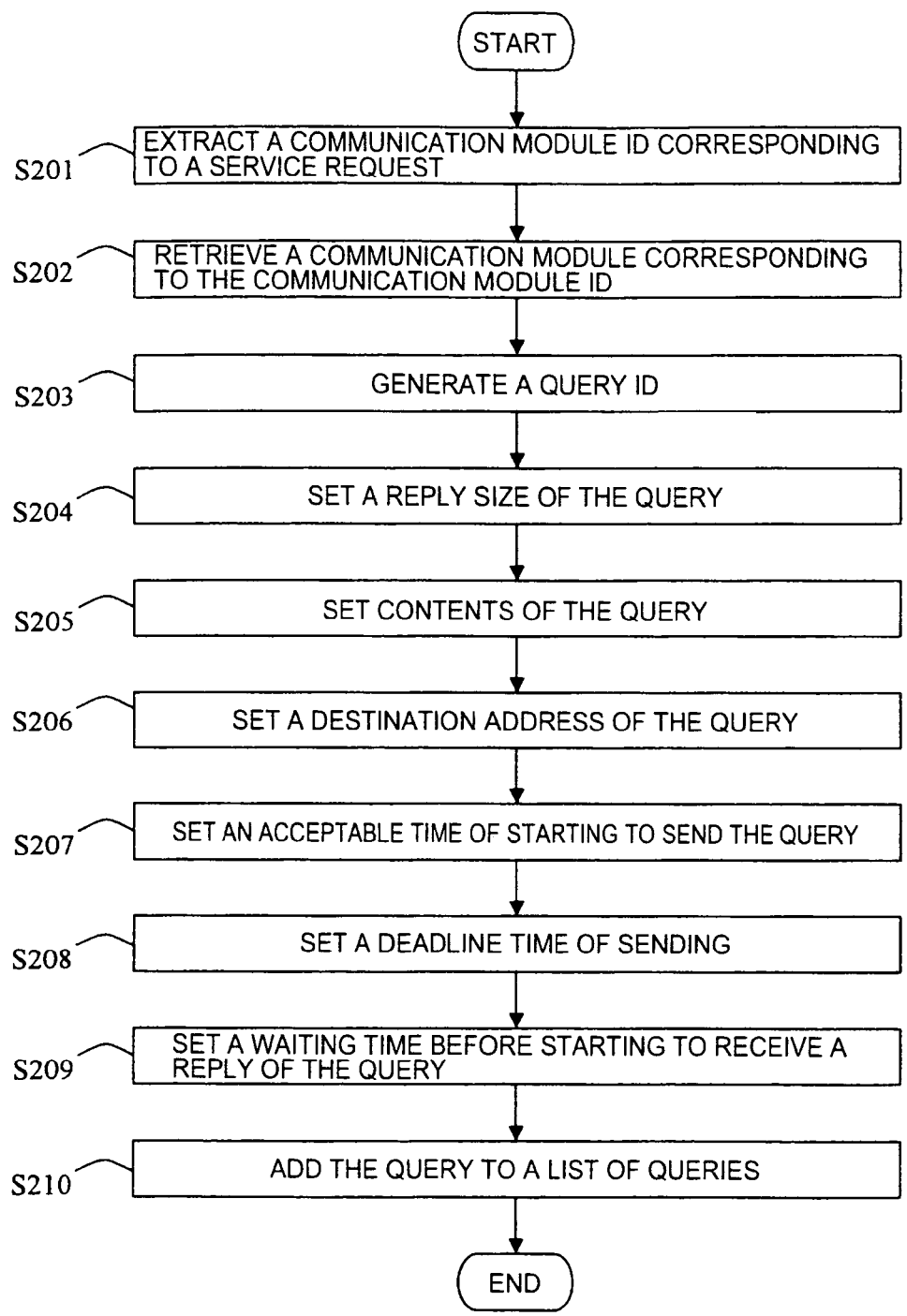
FIG. 10 is a flow chart of processing to generate the list of queries.

Generation processing of the list of queries at S101 is explained by referring to a flow chart of FIG. 10.

(S201) A communication module ID corresponding to a point ID (described in a service request) is extracted from the facility point profile information 122.

(S202) A communication module corresponding to the communication module ID (extracted at S201) is specified in the communication module profile information 121.

(S203) A query ID corresponding to the service request is generated.

(S204) As a reply size of the query, an average size of reply data of the communication module is set.

(S205) As contents of the query, PROTOCOL-A-GET of the communication module and a point ID of the service request are set.

(S206) As a destination address of the query, a network address of the communication module is set.

(S207) As an acceptance time of starting to send the query, a time which the waiting time (before starting to receive) of the communication module is subtracted from the acceptable forward time of the service request is set.

(S208) As a deadline time of sending, a time which the waiting time (before starting to receive) of the communication module is subtracted from the acceptable delay time of the service request is set.

(S209) As a waiting time (before starting to receive reply) of the query, the waiting time (before starting to receive) of the communication module is set.

(S210) The query is added to the list of queries.

Moreover, from a time to generate point data (facility information) to be sent by the communication module or a specification of the communication module, an interval (data generation time) between a time to send the query and a time to generate point data is often known beforehand. In this case, at S207, as the acceptable time of starting to send the query, a time which the data generation time is subtracted from the acceptable forward time of the service request may be set. Furthermore, at S208, as the deadline time of sending of the query, a time which the data generation time is subtracted from the acceptable delay time of the service request may be set. As a result, in case of acquiring the point data from the communication module of which the waiting time before starting to receive is long, adaptability to the service request improves.

Moreover, queries having the same destination address are extracted from the list of queries. As to each query included in a subset of extracted queries, a composition query to unify each query is created. Concretely, point IDs are listed from contents of the queries in the subset without overlapping, and the point IDs are set as new contents of the queries. A maximum of acceptable times (of starting to send) of the queries is set as new acceptable time (of starting to send) of the queries. A minimum of deadline times (of sending) of the queries is set as new deadline time (of sending) of the queries. The composition query is added to the list of queries, and all queries included in the subset are deleted from the list of queries. As a result, a size of the list of queries can be desirably smaller.

Figure 11:
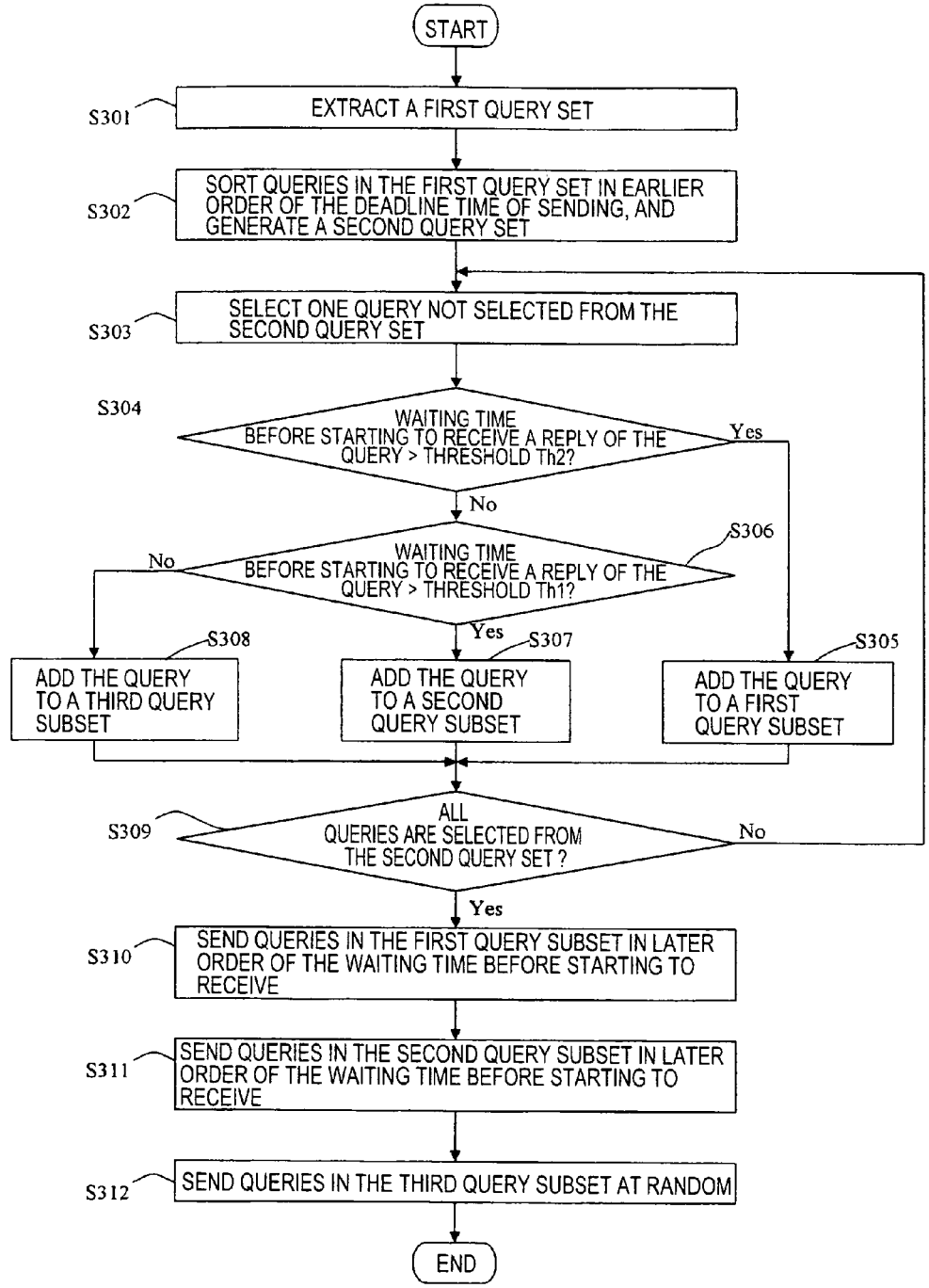
FIG. 11 is a flow chart of processing to add queries to a send queue.

Next, addition processing of queries to send queues at S102 is explained by referring to a flow chart of FIG. 11.

(S301) Queries of which acceptable times (of starting to send) are earlier than a completion time of target period of the list of queries are extracted from the list of queries. A first query set having extracted queries is generated.

(S302) Queries included in the first query set are sorted in earlier order of the deadline time of sending. A second query set having sorted queries is generated.

(S303) From the second query set, one query not selected is selected. Following steps S304-S308 are executed to the selected query.

(S304) A waiting time (before starting to receive a reply of the query) is compared to a threshold Th2. The threshold Th2 is explained afterward. If the waiting time is larger than the threshold Th2, processing is forwarded to S305. If the waiting time is not larger than the threshold Th2, processing is forwarded to S306.

(S305) The query is added to a first query subset.

(S306) The waiting time is compared to a threshold Th1. The threshold Th1 is explained afterward. If the waiting time is larger than the threshold Th1, processing is forwarded to S307. If the waiting time is not larger than the threshold Th1, processing is forwarded to S308.

(S307) The query is added to a second query subset.

(S308) The query is added to a third query subset.

(S309) If all queries included in the second query set are already selected, processing is forwarded to S310. If at least one query included in the second query set is not selected yet, processing is returned to S303.

Figure 13:
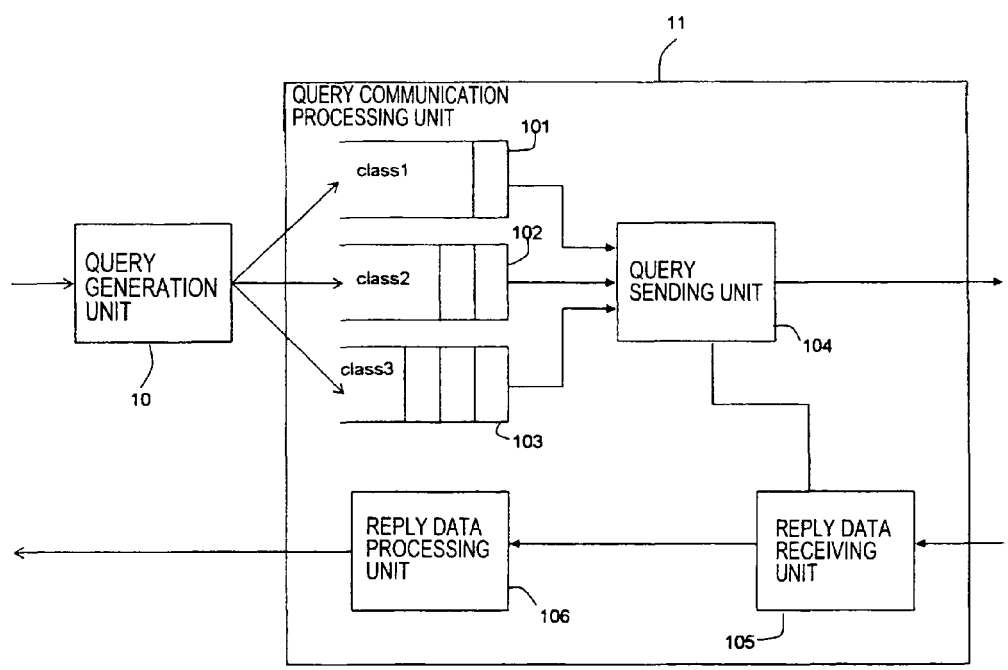
FIG. 13 is a block diagram of a query communication processing unit in FIG. 1.

(S310) Queries included in the first query subset are sorted in longer order of the waiting time (before starting to receive a reply) of the queries. The queries (sorted in longer order of the waiting time) are added to a send queue of class 1 in the query communication processing unit 11 as shown in FIG. 13.

(S311) Queries included in the second query subset are sorted in longer order of the waiting time (before starting to receive a reply) of the queries. The queries (sorted in longer order of the waiting time) are added to a send queue of class 2 in the query communication processing unit 11.

(S312) Queries included in the third query subset are sorted randomly. The queries (sorted randomly) are added to a send queue of class 3 in the query communication processing unit 11.

Figure 12:
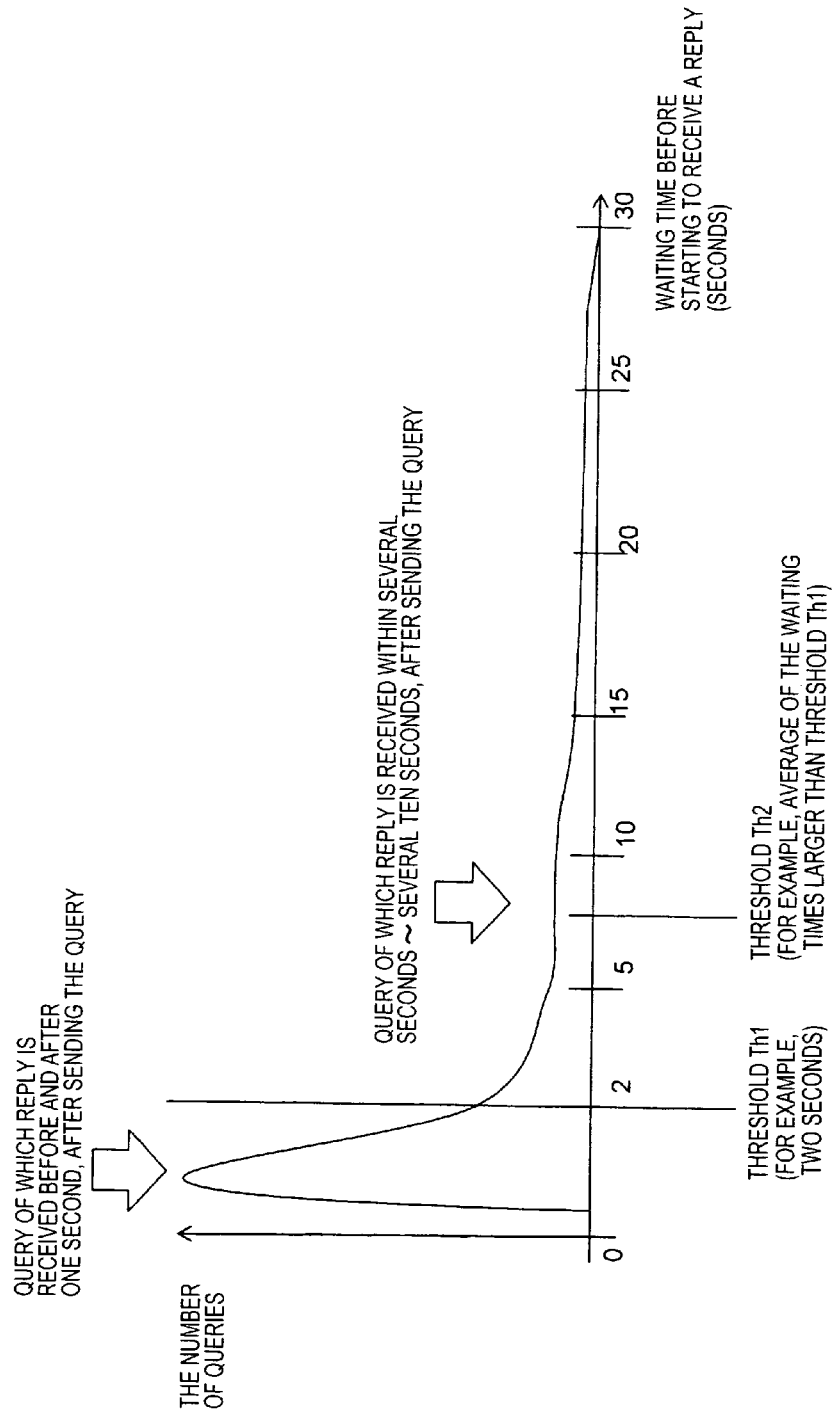
FIG. 12 is a graph showing thresholds used for deciding a priority of the query.

Next, definition of thresholds Th1 and Th2 used at S304 and S306 are explained by referring to a distribution chart of the waiting time (before starting to receive a reply) of FIG. 12.

The threshold Th1 is used for separating queries to send to communication modules which early reply from queries to send to communication modules which late reply. The former (communication modules) can approximately send facility information in one second in response to a query. For example, two seconds (two times of one second) is set as the threshold Th1. As a result, a set of queries to send to the former (communication modules) can be extracted.

As to the latter (communication modules), for example, the waiting time before starting to receive reply is distributed in a range of several seconds~several ten seconds. This distribution is based on a population of queries generated at S101 from point data requested by service. Accordingly, the waiting time is variously distributed depending on service requests.

For example, as shown in distribution of FIG. 12, many queries exist in a region which the waiting times are within 2 seconds, and the number of the waiting times gradually decreases in a range of several seconds ~several ten seconds. In this case, characteristic of queries of which the waiting time is near several seconds is different from characteristic of queries of which the waiting time is near several ten seconds. For example, while waiting replies of the latter (queries), replies of the former (queries) can be stored into a receive window.

The threshold Th2 is used for further separating the latter (queries). A concrete value of the threshold Th2 is determined based on characteristic of distribution, for example, a center value of the waiting times of all queries, a center value of the waiting times larger than the threshold Th1, a multiple of the threshold Th1, and ½ or ¼ of maximum of the waiting times of all queries.

FIG. 13 is a block diagram of the query communication processing unit 11. The query communication processing unit 11 includes send queues 101~103 of each class, a query sending unit 104, a reply data receiving unit 105, and a reply data processing unit 106.

The send queues 101~103 are storage units to temporally store queries (generated by the query generation unit 10) in correspondence with each priority. The priority represents a class based on the waiting time (before starting to receive reply) of the query, and this classification is executed at S304~S308. In an example of FIG. 13, the number of priorities assigned by the query generation unit 10 is equal to the number of send queues.

Based on algorithm indicated from the outside in the scheduling apparatus 1, the query sending unit 104 extracts each query from send queues 101~103 of each class, and sends each query to the communication module as a destination of the query.

The reply data receiving unit 105 receives reply data (facility information) of the query (sent by the query sending unit 104), and supplies the reply data to the reply data processing unit 106. The reply data processing unit 106 changes the reply data to a data format or a communication format (requested by a system or a database outside the scheduling apparatus 1), and supplies the converted reply data. For example, as to a service which has sent a service request, the reply data is returned to the service as data required by the service request. The reply data processing unit 106 may be same as the received data processing unit 15.

Figure 14:
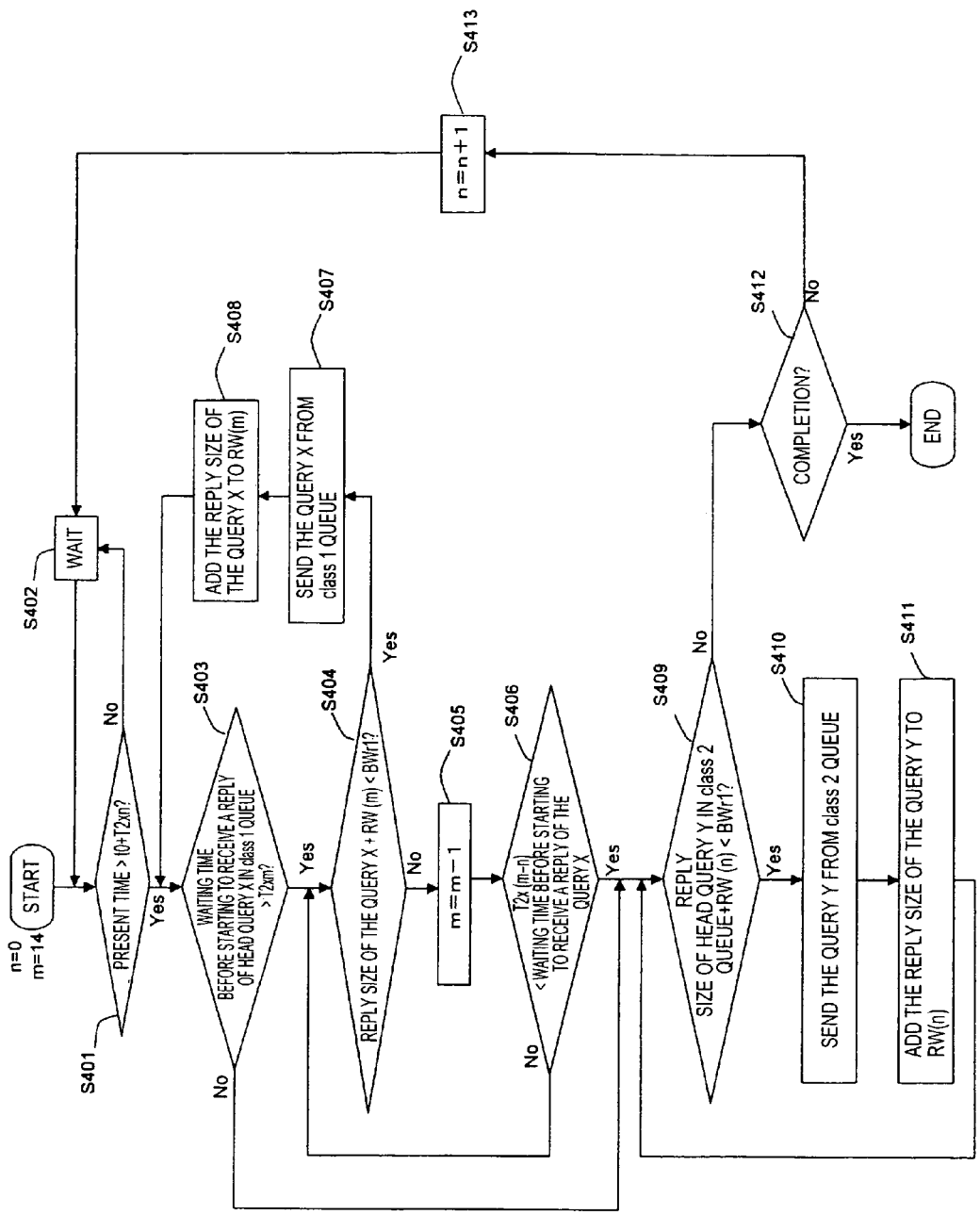
FIG. 14 is a flow chart of processing to send queries.

Next, processing of the query sending processing unit 11 at S103 is explained by referring to a flow chart of FIG. 14 and a window of FIG. 15. In FIG. 11, queries are divided into three classes by two thresholds Th1 and Th2. However, in FIGS. 14 and 15, queries are divided into two classes by one threshold. The query-sending processing of this case is explained.

At start of processing, the query sending unit 104 initializes "n" representing a unit period of a planned send window (including the present time) to "0". The unit period is a period which a time sequence from a start time t0 of sending queries is divided by a unit time T2 (For example, 2 seconds). Furthermore, the query sending unit 104 initializes "m" to a number of the last unit period. Moreover, as to a unit period of a predicted receive window corresponding to a unit period of the planned send window, a time which an offset value (½ of the threshold Th1) of communication delay is added to t0 is set as a base time, and a time sequence from the base time is divided into each unit period by T2. Each unit period is indicated by 0~m.

A number of the last segment is a quotient value which the unit period T3 is divided by the unit period T2. "T3" is a sum of a maximum of the waiting times of the communication modules (as targets of the scheduling apparatus 1 in unit periods of processing at S103) and a preliminary offset value (For example, 30 seconds). In this case, number of the last period is 14. "m" is a cursor value to store (occupy) into each unit period of the predicted receive window (shown in FIG. 15B) from the last period in order of later time.

(S401) It is decided whether the present time is included in the unit period. If the present time is included, processing is forwarded to S403. If the present time is not included, processing is forwarded to S402.

(S402) Processing is waited until the present time is equal to a start time of next processing.

(S403) If the waiting time (before starting to receive reply) of a head query X in a send queue of class 1 (to store queries of which the waiting time is long) is longer than (T2×M), i.e., if the waiting time of the head query X is suitable to store into the predicted receive window (shown in FIG. 15B) from the last unit period, processing is forwarded S S404. If not so, processing is forwarded to S409.

(S404) It is decided whether a sum of a reply size of query X and a window size RW(m) reserved at the present period m in the predicted reserve window is smaller than an upper limit BWr1 of receiving band. If the sum is smaller than the upper limit, processing is forwarded to S407. If the sum is larger than or equal to the upper limit, processing is forwarded to S405.

(S405) The number "m" is decremented.

(S406) It is decided whether reply data (facility information) can be stored into a window size RW (m−1) at a previous period (m−1) in the predicted reserve window. If the reply data can be stored, processing is returned to S404. If not so, processing is forwarded to S409. In latter case, queries stored in the send queue of class 1 cannot be sent. Accordingly, the query communication processing unit 11 informs the query generation unit 10 to add these queries to the list of queries again.

(S407) A query X is extracted from the send queue of class 1 and sent.

(S408) A reply size of the query X is added to RW(m).

(S409) It is decided whether a sum of a reply size of a head query Y in a send queue of class 2 (to store queries of which the waiting time is short) and a window size RW(n) reserved at the present period n in the predicted reserve window is smaller than the upper limit BWr1 of receiving band. If the sum is smaller than the upper limit, processing is forwarded to S410. If the sum is larger than or equal to the upper limit, processing is forwarded to S412.

(S410) A query Y is extracted from the send queue of class 2 and sent.

(S411) A reply size of the query Y is added to RW(n).

(S412) Completion condition is decided. In case of "n> (T3÷T2−1)", processing is completed. In case of "n< (T3÷T2−1)", processing is forwarded to S413.

(S413) The number "n" is incremented. Processing is waited until the present time is equal to a start time of next processing.

Figure 15A:
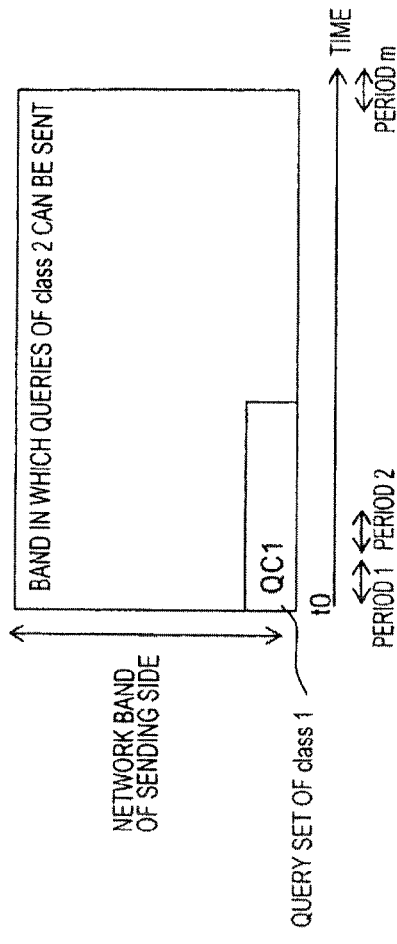
FIGS. 15A and 15B are schematic diagrams of one example of network band used for sending a query and receiving a reply of the query.
Figure 15B:
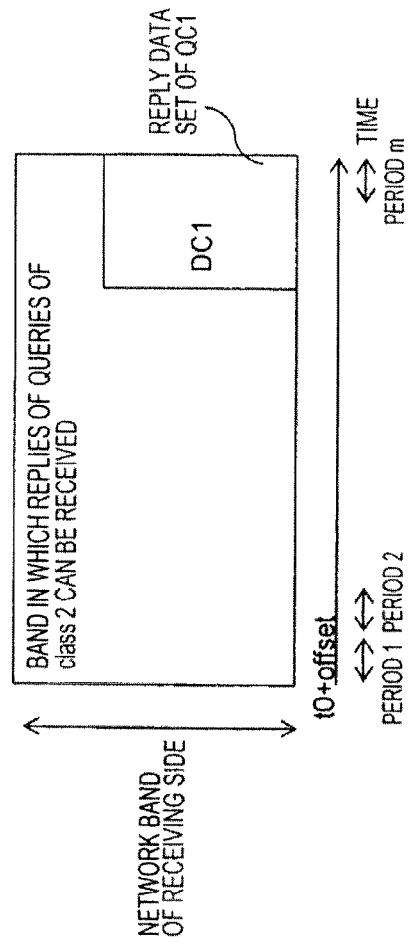

By using this method, as shown in FIGS. 15A and 15B, in response to queries QC1 sent from the send queue of class 1, reply data DC1 are stored into the predicted receive window from the last unit period within a range of receiving band BWr1. This method is fundamental. By finely adjusting this method, the predicted receive window can be further effectively stored.

For example, at S406 of FIG. 14, assume that the waiting time (before starting to receive reply) of a query X is larger than a difference between a period m to store reply data (in the predicted reserve window) and a period n to send the query X (in the planned send window). In this case, if the query X is sent at the period n, reply data will be received (stored) at a unit segment over the segment m in the predicted reserve window. As a result, constraint of the receiving band BWr1 is broken.

As to query-distribution having this case, above-mentioned threshold Th2 is used to newly set a send queue of class 3. The query generation unit 10 adds queries of which the waiting time is larger than the threshold Th2 to the send queue of class 1. As a result, as to queries stored in the send queue of class 1, the constraint at S406 cannot be broken.

Figure 16A:
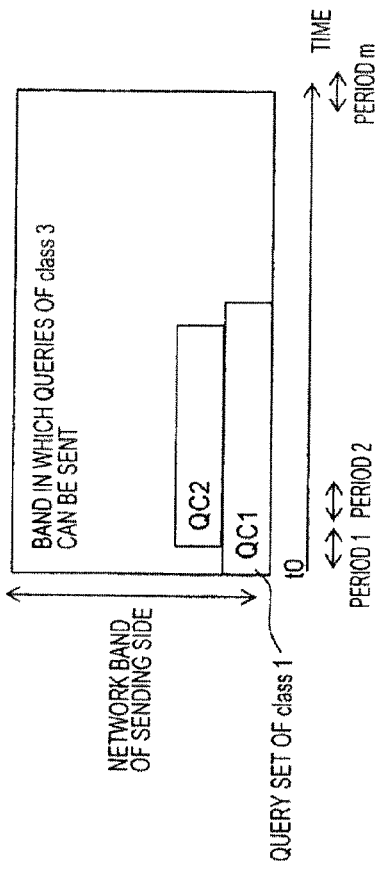
FIGS. 16A and 16B are schematic diagrams of another example of network band used for sending a query and receiving a reply of the query.
Figure 16B:
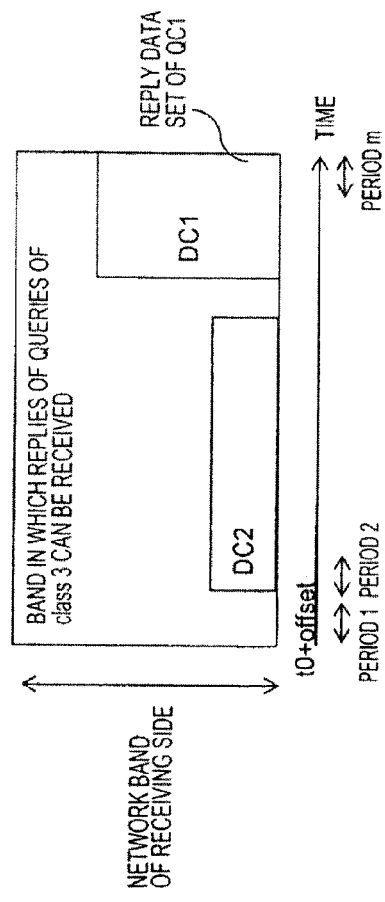

Furthermore, queries of which the waiting time is smaller than the threshold Th1 are add to the send queue of class 3. As shown in FIGS. 16A and 16B, for example, by continually sending each query from the send queue of class 3 at a predetermined interval, reply data (of queries sent from the send queue of class 3) are received (stored) at a unit period before last periods reserved by another reply data (of queries sent from the send queue of class 1) in the predicted receive window. Furthermore, reply data (of queries sent from the send queue of class 2) are stored into other (remained) unit periods of the predicted receive window. As a result, the receiving band can be effectively utilized.

Furthermore, assume that a receiving time (between a time of starting to receive and a time of completing to receive) of reply data is longer than a unit period, and query of which reply data are continually received over a plurality of unit segments is sent. In this case, at S404 and S409, as a reply size of query for each unit period, a new reply size ((the reply size)/(the receiving time)×(the unit period T2)) to receive reply data in the unit period is used. As to unit periods tr0~trx (x is a quotient of "(the receiving time)/(the unit period)") to continually receive reply data, a step "RW(tr0)~RW(trx) ≦BWr1" is set at S404 and S409. As a result, usage information of the predicted receive window is further correctly predicted, and the receiving band can be effectively used.

Figure 17:
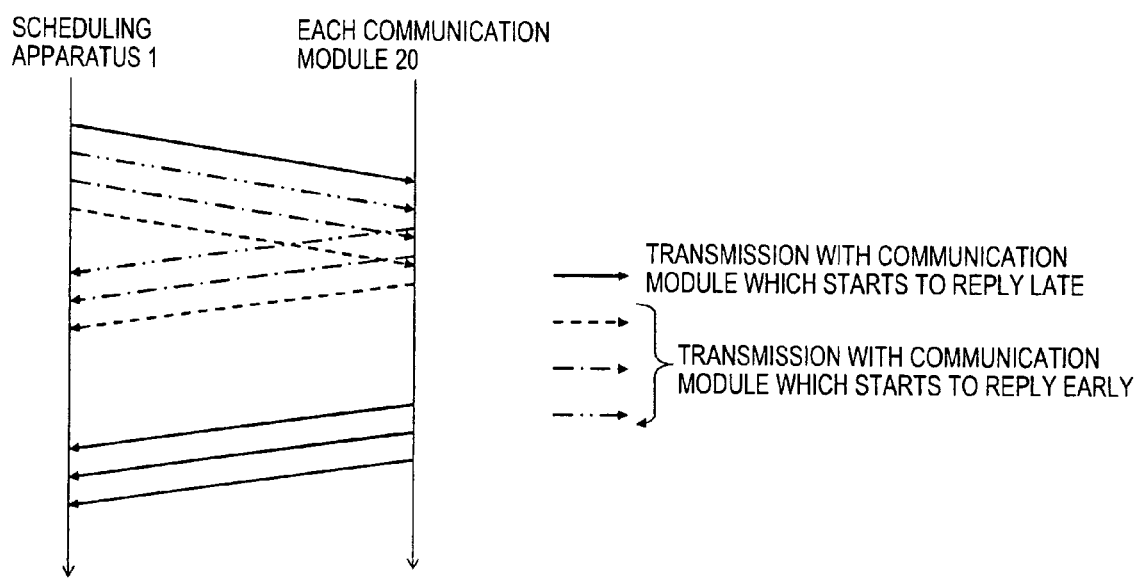
FIG. 17 is a schematic diagram of one example of transmission with a plurality of communication modules which start to reply at different timings after receiving the query.

By above-mentioned query-sending, as shown in FIG. 17, as to a free band of network occurred by sending queries to communication modules which replies late, query-reply packets sent from communication module which replies early can be stored into the free band. As a result, usage efficiency of the network improves.

In this way, in the scheduling apparatus 1 of the first embodiment, the waiting time before starting to receive reply data (from sending queries) is taken into consideration. Accordingly, the network of center side is effectively utilized, and time to acquire point data (time required for acquiring facility information) can be reduced.

The Second Embodiment

Figure 18:
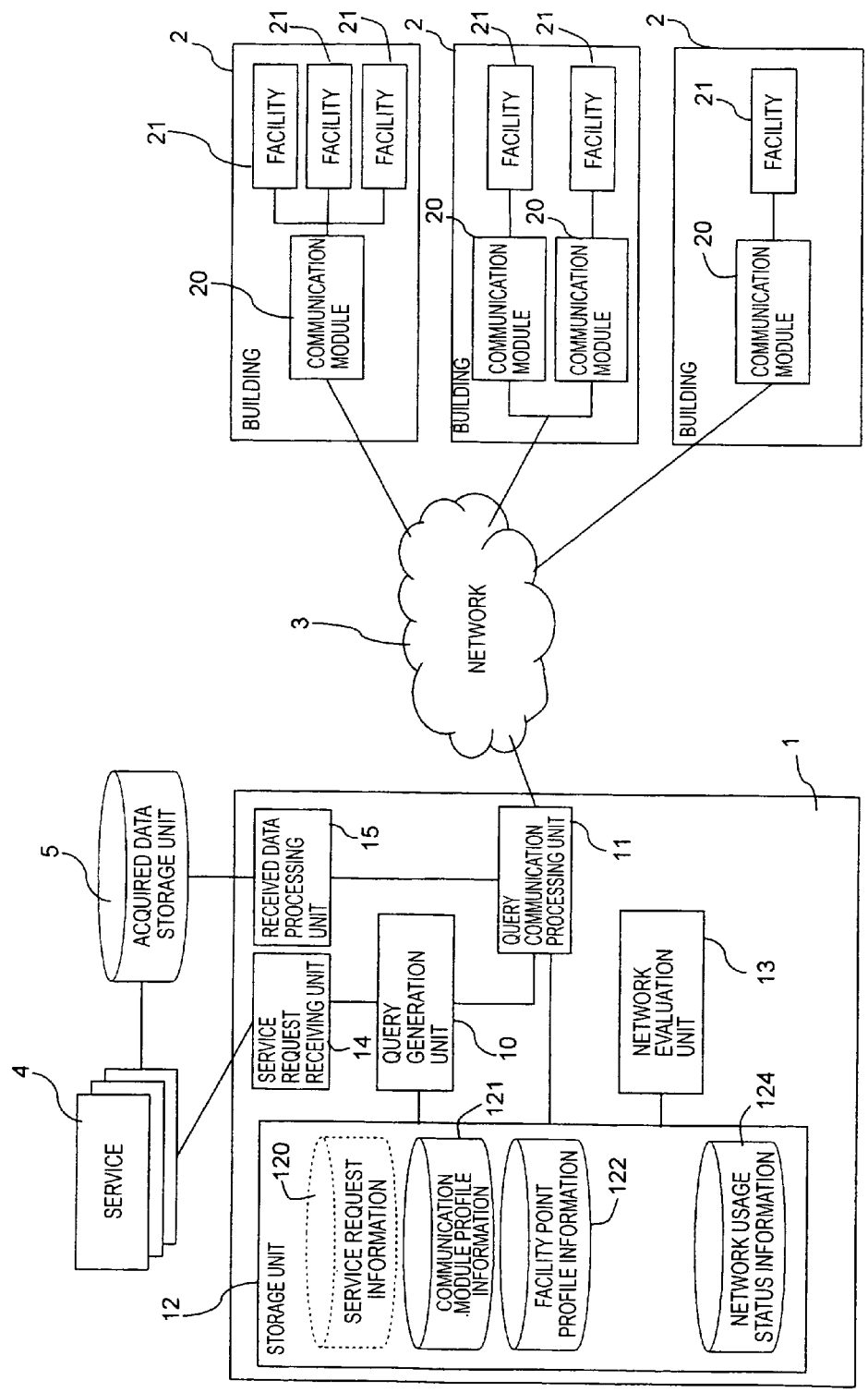
FIG. 18 is a block diagram of the scheduling apparatus according to a second embodiment.

FIG. 18 is a block diagram of the scheduling apparatus according to the second embodiment. As to the scheduling apparatus of the second embodiment, a network evaluation unit 13 is added to the scheduling apparatus 1 of the first embodiment shown in FIG. 1.

Furthermore, the query communication processing unit 11 actually measures a waiting time (between a sending time of query and a receiving time of reply) of each communication module, and stores the waiting time as network usage status information 124 into the storage unit 12. As to the same unit as the first embodiment, the same reference number is assigned, and its explanation is omitted.

The network evaluation unit 13 calculates a difference between a waiting time A (actually measured) of a communication module 20 stored in the network usage status information 124 and a waiting time B of the communication module 20 stored in the communication module profile information B. If absolute value of the difference is larger than a predetermined ratio (For example, 20%) of the waiting time B, the waiting time A (as new waiting time of the communication module 20) is overwritten onto the waiting time B. Briefly, the communication module profile information 121 is updated.

In this case, by not one measurement but a plurality of measurements, an average or the most frequent value is calculated from the plurality of measurements. This statistical stable value (the average or the most frequent value) can be desirably used as the waiting time A.

Furthermore, the network evaluation unit 13 may monitor a usage rate of network by using OS of the scheduling apparatus 1 or additive function of middleware. When the receiving band is larger (or smaller) than BWr1 (shown in FIG. 14) as a predetermined ratio of BWr1, a communication module which has sent reply data received until this trigger timing is specified. The network evaluation unit 13 may execute abovementioned update processing to the specified communication module only, in order to raise processing efficiency.

Furthermore, as to a reply of a query having a specified point ID, if a receiving time of the reply (sent from a communication module corresponding to the specified point ID) is different from the waiting time of the communication module, information of the communication module is copied from the communication module profile information 121, and new communication module ID is assigned. As new waiting time before starting to receive reply, a waiting time actually measured for the specified point ID is stored. In the facility point profile information 122, the communication module ID corresponding to the specified point ID is updated with the new communication module ID. Briefly, by generating virtual information of the communication module, irregular value of the specified point may be processed in different way.

As mentioned-above, the network evaluation unit 13 updates the waiting time (before starting to receive reply) stored in the communication module profile information 121. At next processing time of the query generation unit 10, generation of queries and assignment of priority are executed using the updated (corrected) waiting time. Accordingly, the predicted receive window can be further accurately operated.

In the scheduling apparatus 1 of the first and second embodiments, upper limit of sending band and receiving band of query can be lowered. For example, if a service request includes a control request (instruction or plan) for facilities, assume that the sending band necessary for the control request is BWs2, and upper limit of sending band of the planned send window (shown in FIG. 15A) is BWs1. In this case, BWs1 is replaced with (BWs1-BWs2), and a decision step "whether a sum of a sending size of query X and a size SW (n) of the planned send window is smaller than BWs1" is added before S404 and S409 in FIG. 14. Accordingly, queries to acquire point data can be sent within a range not over new BWs1, and BWs2 necessary for the control request can be secured.

Furthermore, if information such as a warning or an accident from facilities is notified as event-driven communication from the communication module, assume that receiving band necessary for the event-driven communication is BWr2. In this case, by replacing BWr1 (shown in FIG. 14) with (BWr1-BWr2), band necessary for the event-driven communication can be secured.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A scheduling apparatus for sending queries to communication modules in buildings and receiving facility information measured at monitor-control points from the communication modules, comprising:
a storage unit configured to store a network address of each communication module, a waiting time to receive the facility information from each communication module after sending a query, an average size of the facility information, and a connection relationship between each communication module and the monitor-control points;
a receiving unit configured to receive a service request indicating at least one monitor-control point;
a generation unit configured to generate queries by referring to the storage unit, each query including the network address of a communication module connected with a monitor-control point indicated by the service request, and to decide a priority of each query based on the waiting time corresponding to the communication module; and
a processing unit configured to add each query to a first send queue or a second send queue based on the priority, to create a predicted receive window based on the waiting time and the average size corresponding to the communication module of the network address included in the each query, and to send queries from the first send queue and queries from the second send queue based on the predicted receive window, a timing to send from the first send queue being earlier than a timing to send from the second send queue.

2. The apparatus according to claim 1,
wherein the waiting time corresponding to the priority of the queries added to the first send queue is longer than the waiting time corresponding to the priority of the queries added to the second send queue.

3. The apparatus according to claim 2,
wherein the processing unit adds each query to the first send queue and the second send queue in longer order of the waiting time.

4. The apparatus according to claim 1,
wherein the processing unit measures a time between a sending time of the query and a receiving time of the facility information for each communication module,
the apparatus further comprising:
an evaluation unit configured to overwrite the time onto the waiting time in the storage unit when a difference between the time and the waiting time is larger than a predetermined ratio of the waiting time.

5. A scheduling method for sending queries to communication modules in buildings and receiving facility information measured at monitor-control points from the communication modules, the method comprising:
storing in a memory, a network address of each communication module, a waiting time to receive the facility information from each communication module after sending a query, an average size of the facility information, and a connection relationship between each communication module and the monitor-control points;
receiving a service request indicating at least one monitor-control point;
generating queries by referring to the memory, each query including the network address of a communication module connected with a monitor-control point indicated by the service request;
deciding a priority of each query based on the waiting time corresponding to the communication module;
adding each query to a first send queue or a second send queue based on the priority;
creating a predicted receive window based on the waiting time and the average size corresponding to the communication module of the network address included in the each query; and
sending queries from the first send queue and queries from the second send queue based on the predicted receive window, a timing to send from the first send queue being is same as or earlier than a timing to send from the second send queue.

6. A non-transitory computer readable medium storing a computer program for causing a computer to perform operations for sending queries to communication modules in buildings and receiving facility information measured at monitor-control points from the communication modules, the operations comprising:
storing in a memory, a network address of each communication module, a waiting time to receive the facility information from each communication module after sending a query, an average size of the facility information, and a connection relationship between each communication module and the monitor-control points;
receiving a service request indicating at least one monitor-control point;
generating queries by referring to the memory, each query including the network address of a communication module connected with a monitor-control point indicated by the service request;
deciding a priority of each query based on the waiting time corresponding to the communication module;
adding each query to a first send queue or a second send queue based on the priority;
creating a predicted receive window based on the waiting time and the average size corresponding to the communication module of the network address included in the each query; and
sending queries from the first send queue and queries from the second send queue based on the predicted receive window, a timing to send from the first send queue being earlier than a timing to send from the second send queue.

* * * * *